(12) United States Patent
Hardy (10) Patent No.: US 7,177,383 B2
(45) Date of Patent: Feb. 13, 2007

(54) METHOD AND SYSTEM FOR SAFETY REGULATION IN NUCLEAR POWER REGULATING SYSTEMS

(76) Inventor: James Hardy, 1405 Presto, No. 2, Idaho Falls, ID (US) 83402

( * ) Notice: Subject to any disclaimer, the term of this patent is extended or adjusted under 35 U.S.C. 154(b) by 236 days.

(21) Appl. No.: 10/788,504

(22) Filed: Feb. 26, 2004

(65) Prior Publication Data

US 2005/0185751 A1 Aug. 25, 2005

Related U.S. Application Data

(60) Provisional application No. 60/541,345, filed on Feb. 2, 2004.

(51) Int. Cl.
*G21C 7/06* (2006.01)
(52) U.S. Cl. ...................... 376/228; 324/511
(58) Field of Classification Search ................ 378/228; 376/207, 219, 228, 327; 324/511, 522
See application file for complete search history.

(56) References Cited

U.S. PATENT DOCUMENTS

| | | | | |
|---|---|---|---|---|
| 3,311,907 A | * | 3/1967 | Teal | 340/662 |
| 3,579,223 A | * | 5/1971 | McKaig | 340/530 |
| 3,796,890 A | | 3/1974 | Thompson et al. | 376/230 |
| 4,016,034 A | | 4/1977 | Musick | 376/242 |
| 4,306,270 A | * | 12/1981 | Miller et al. | 361/187 |
| 4,363,778 A | * | 12/1982 | Abbott | 376/228 |
| 4,399,095 A | | 8/1983 | Morris | 376/216 |
| 4,548,784 A | | 10/1985 | Watari | 376/216 |
| 4,683,102 A | | 7/1987 | Martin et al. | 376/209 |
| 4,697,093 A | | 9/1987 | Sutherland et al. | 307/38 |
| 4,699,749 A | | 10/1987 | McAtee et al. | 376/216 |
| 4,843,537 A | | 6/1989 | Arita et al. | 700/82 |
| 4,986,952 A | | 1/1991 | Bourin et al. | 376/215 |
| 4,989,129 A | | 1/1991 | Arita et al. | 700/82 |
| 4,992,380 A | * | 2/1991 | Moriarty et al. | 436/55 |
| 5,287,264 A | | 2/1994 | Arita et al. | 700/79 |
| 5,559,438 A | | 9/1996 | Bedouet et al. | 324/418 |
| 5,999,583 A | * | 12/1999 | Pysnik et al. | 376/228 |
| 6,438,973 B1 | * | 8/2002 | Yoshida et al. | 62/126 |
| 6,553,090 B2 | | 4/2003 | Fukasawa | 376/216 |
| 6,972,940 B2 | * | 12/2005 | Tsukasaki et al. | 361/90 |
| 2006/0043933 A1 | * | 3/2006 | Latinis | 320/132 |
| 2006/0159215 A1 | * | 7/2006 | Kim et al. | 376/245 |

* cited by examiner

*Primary Examiner*—Ella Colbert
*Assistant Examiner*—Daniel Lawson Greene, Jr.
(74) *Attorney, Agent, or Firm*—Derek H. Maughan; Stephen M. Nipper; Dykas, Shaver & Nipper, LLP (57) ABSTRACT

A system and method for monitoring rod moving coils in nuclear power system. The system ensures that these coils are each functioning properly, and thus prevent movement of the other coils when a dysfunctional coil is detected. The method for accomplishing this monitoring is to provide constant power to all of the coils and to measure the negatively induced EMF from this induction. This level of EMF is then compared to a standard EMF. When the EMF level is below a threshold limit, which may be either preset or calculated from a variety of other variables, a signal is sent to an alarm.

5 Claims, 6 Drawing Sheets

METHOD AND SYSTEM FOR SAFETY REGULATION IN NUCLEAR POWER REGULATING SYSTEMS

PRIORITY

This application claims the priority date of the provisional application No. 60/541,345 entitled METHOD AND SYSTEM FOR SAFETY REGULATION IN NUCLEAR POWER REGULATING SYSTEMS filed by James Hardy on Feb. 2, 2004, the disclosure of which is incorporated herein by reference.

BACKGROUND OF THE INVENTION

1. Field of the Invention

The present invention generally relates to nuclear power plants, and more particularly to safety mechanisms for preventing dropped control rods in such systems.

2. Background Information

In nuclear power plants, control rods are lifted and lowered within a reactor core to control the rate or reaction and the energy output from the nuclear reactor. These control rods are placed in proximity to fuel elements, which contain nuclear fissionable fuel. Generally, the greater the number of neutrons in the reactive region, the greater the number of fissions of fuel atoms that take place, and consequently the greater the amount of energy released. Energy in the form of heat is removed from the reactive region by a coolant, which flows through the region and then flows to a heat exchanger wherein the heat from the reactor coolant is used to generate steam for driving turbines to generate electricity.

To decrease the energy output of the nuclear reactor, the control rods, made of a material that absorbs neutrons, are inserted into the reactive region. The greater the number of control rods and the farther the control rods are inserted within the reactive region, the greater the number of neutrons will be absorbed. Hence, the energy output of the nuclear reactor will be decreased. Conversely, to increase the output of the nuclear reactor, the nuclear control rods are withdrawn from the reactive region. When this occurs, the number of neutrons absorbed decreases and the number of neutrons that are enabled to cause the collisions increases. This causes increased fission to take place within the core. Thus, the position and location of these rods are crucial to the correct operation of the power generating facility.

Control rods are typically arranged in banks, with each bank comprising a number of groups of control rods. The proper placement and movement of these control rods is crucial to the proper functioning of the reactor and the safety of all those around the plant.

A variety of prior art systems have been utilized to control the placement and movement of the control rods. One of these systems is a jack type system that utilizes a plurality of electrical coils to incrementally insert or withdraw each control rod within a reactor. These incremental steps are usually repeated as many times as necessary by the various banks, or groups of banks, of control rods to position the rods in a desired location to produce a desired amount of output from the reactor.

An example of such a mechanism is found in U.S. Pat. No. 3,158,766. This mechanism describes a set of three inductive coils, one for gripping, one for lifting, and one for holding the control rod in a stationary position. Therefore, when there are a number of control rods within a reactor, there will also be a corresponding number of gripping, lifting, and holding coils. These rods must be lifted in a predetermined order so that no one rod is above or below any of the other rods within the group. The current requirements for each of the coils within these groups will be the same for all of the corresponding coils in all of the lift, gripper, and holding or stationary coils. In order to control and monitor the movement of these rods, various systems have been described.

U.S. Pat. No. 3,796,890 ('890) describes such a control system. In this system, a half wave solid state rectifying bridge is provided for applying multi-level direct current from a three-phase source to a single or plurality of load elements. The direct current is provided according to a predetermined cyclical signal reference current to regulate and minimize the amount of energy used by the load elements. This system utilizes silicon rectifiers, switching devices or thyristors, each of which is connected with output from a three-phase power system to provide direct current to a respective coil. The value of the direct current from the outputs of these thyristors is determined according to the time at which each thyristor is fired. For example, if the thyristors are sequentially fired at predetermined points near the maximum positive point of each of the three phases of the three-phase power source, the resulting output will have a high average value. On the other hand, if the thyristors are fired at predetermined points shortly after the maximum negative point of each of the power phases, negative forcing will occur. This causes energy stored in the load element or elements to be returned to the power supply system. This system also provides for a variety of methods for regulating the angle at which the thyristors are fired, and for noting faults in a system based upon the input and regulation of produced digital signals.

Each of the inductive coils is controlled by the power regulating system. These coils provide magnetic flux to operate mechanical parts that effect movement of the rod. When it is desired to move a rod, a power regulating system provides multiple levels of current to the coils in a controlled sequence. The current levels are called zero, reduced, and full. When no movement of the rods is desired, the power regulating system energizes the stationary gripper at reduced current and all other coils receive zero current. Full current is applied to the coils only during movement, and then only briefly.

One of the problems with the invention described in the '890 patent is that this method and system cannot detect the failure of power current to arrive at its individual loads, such as the gripping, moving, and holding coils within a nuclear power plant. This prior art system only notices some faults, and, when it does, the device attempts to hold the rods by applying reduced current to the moving gripper. Particularly, this system is unable to detect the presence of blown fuses in a moving or stationary gripper. As a result, it is possible for a rod to be dropped from an open connector near a reactor. Even if those rods only fall a fraction of an inch, it can cause imbalance to the entire system and is a dangerous situation that must be avoided. Such a result could be catastrophic because it would substantially vary the rate of reaction within the core.

Therefore, what is needed is an improved system and method for detecting faults in an electrical power system and for alarming an individual when these faults have been noticed. What is also needed is an improved system for preventing the dropping of control rods in a nuclear power generation system. An improved method for detecting these power failures and preventing the movement of rods when such a fault is detected is also needed.

Accordingly, it is an object of the present invention to provide an improved system and method for detecting faults in an electrical power system, and for alarming an individual when these faults have been noticed. It is another object of the present invention to provide an improved system for preventing the dropping of control rods in a nuclear power generation system. Another object of the invention is to provide an improved method and system for detecting these power failures, and to prevent the movement of rods when such a fault is detected.

Additional objects, advantages, and novel features of the invention will be set forth in part in the description which follows and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

The present invention is a method and system for detecting certain failures within the power regulating system of a nuclear power plant control rod system, described in U.S. Pat. No. 3,796,890. The contents of that patent are herein incorporated by reference as describing the device upon which the present invention is associated and connected with. This method for detecting the absence of negative current within the aforementioned system would enable this system to detect certain single failures which it cannot otherwise detect, and react to them for the purpose of preventing a control rod from dropping. Such a method detects conditions indicative of an imminent loss of ability to hold any control rod by a plurality of error detecting circuits.

The method of the present invention comprises the steps of monitoring the magnetically induced counter-EMF produced by the individual coils in the system during those intervals in which the applied voltage is negative. Particularly, the interval beginning with the respective phase's zero crossing and ending when the subsequent thyristor fires are monitored. This monitoring is done by a monitor circuit, which regulates the EMF that is produced. The monitor circuit will be switched off during actual rod movement because during the actual rod stepping, the power regulating system alters the firing angle such that no interval of applied negative voltage exists. An individual rod step takes approximately 780 milliseconds, so these interruptions in monitoring are brief. The monitoring circuit described in the present invention measures this induced EMF, and signals an alarm based upon predetermined differences. In the preferred embodiment, this is done by measuring the absence of a negative EMF. This invention also encompasses a presence of positive monitoring, however, the absence of negative method enables a party to detect more failures, such as the loss of the bridge itself.

The present invention modifies the invention described in the '890 patent by creating a monitoring circuit that includes simple diodes on the moving and stationary gripper coils, and allows individual coil monitoring to take place. The monitoring circuit in the present invention compares, during the intervals of negative applied voltage, the inductively generated counter EMF of each coil to the output of the three-phase bridge. This circuit then generates appropriate alarms based upon a predetermined difference between the inductively induced counter EMF of each coil and the output of the three-phase bridge. The method and system shown and described in the present invention can also detect failures during actual rod stepping.

The method of the present invention is accomplished by a monitoring circuit configured for interaction with each moving gripper. This monitoring circuit is made up of a bridge voltage monitor that senses the output of the three-phase bridge at a designated location. This bridge voltage monitor produces an output proportional to the peak negative voltage present at its input. This output is connected to individual coil monitors and is used as a set point. This set point may be either manually set or calculated from existing information. The deviation of individual EMF readings from this set point provides a basis for signaling and activating the alarms. This system provides individualized monitoring to the various coils and increased detection of faults within the device. This then correlates to a decreased likelihood of rods being dropped.

Still, other objects and advantages of the present invention will become readily apparent to those skilled in this art from the following detailed description wherein I have shown and described only the preferred embodiment of the invention, simply by way of illustration of the best mode contemplated by carrying out my invention. As will be realized, the invention is capable of modification in various obvious respects all without departing from the invention. Accordingly, the drawings and description of the preferred embodiment are to be regarded as illustrative in nature, and not as restrictive in nature.

The purpose of the foregoing abstract is to enable the United States Patent and Trademark Office and the public generally, and especially the scientists, engineers, and practitioners in the art who are not familiar with patent or legal terms or phraseology, to determine quickly from a cursory inspection the nature and essence of the technical disclosure of the application. The abstract is neither intended to define the invention of the application, which is measure by the claims, nor is it intended to be limiting as to the scope of the invention in any way.

DESCRIPTION OF THE PREFERRED EMBODIMENTS

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

FIGS. 1 and 2 of the present invention show a preferred first embodiment of the present invention. The present invention is an improved method for monitoring the function and capacity of rod stepping or moving devices. This method is intended for use with the configuration for rod placement and regulation that is shown and described in U.S. Pat. No. 3,796,890, the contents of which are herein incorporated by reference. As described earlier, the device in the '890 patent describes a power regulation system for a nuclear power plant wherein sets of three inductive coils, one for gripping, one for lifting, and one for holding a control rod in a stationary position, are utilized to grip, hold, and move individual control rods. Therefore, when a number of control rods are positioned within a reactor there will also be an equal corresponding number of gripping, lifting and holding coils for each of these rods.

The present invention is a system and method for monitoring these coils to ensure that they are each functioning properly, and thus prevent movement of the other coils when a dysfunctional coil is detected. The method for accomplishing this monitoring is to provide constant power to all of the coils, and to measure the negatively induced EMF from this induction. This level of EMF is then compared to a standard EMF. When the EMF level is below a threshold limit, which may be either preset or calculated from a variety of other variables, a signal is sent to an alarm.

Figure 1A:
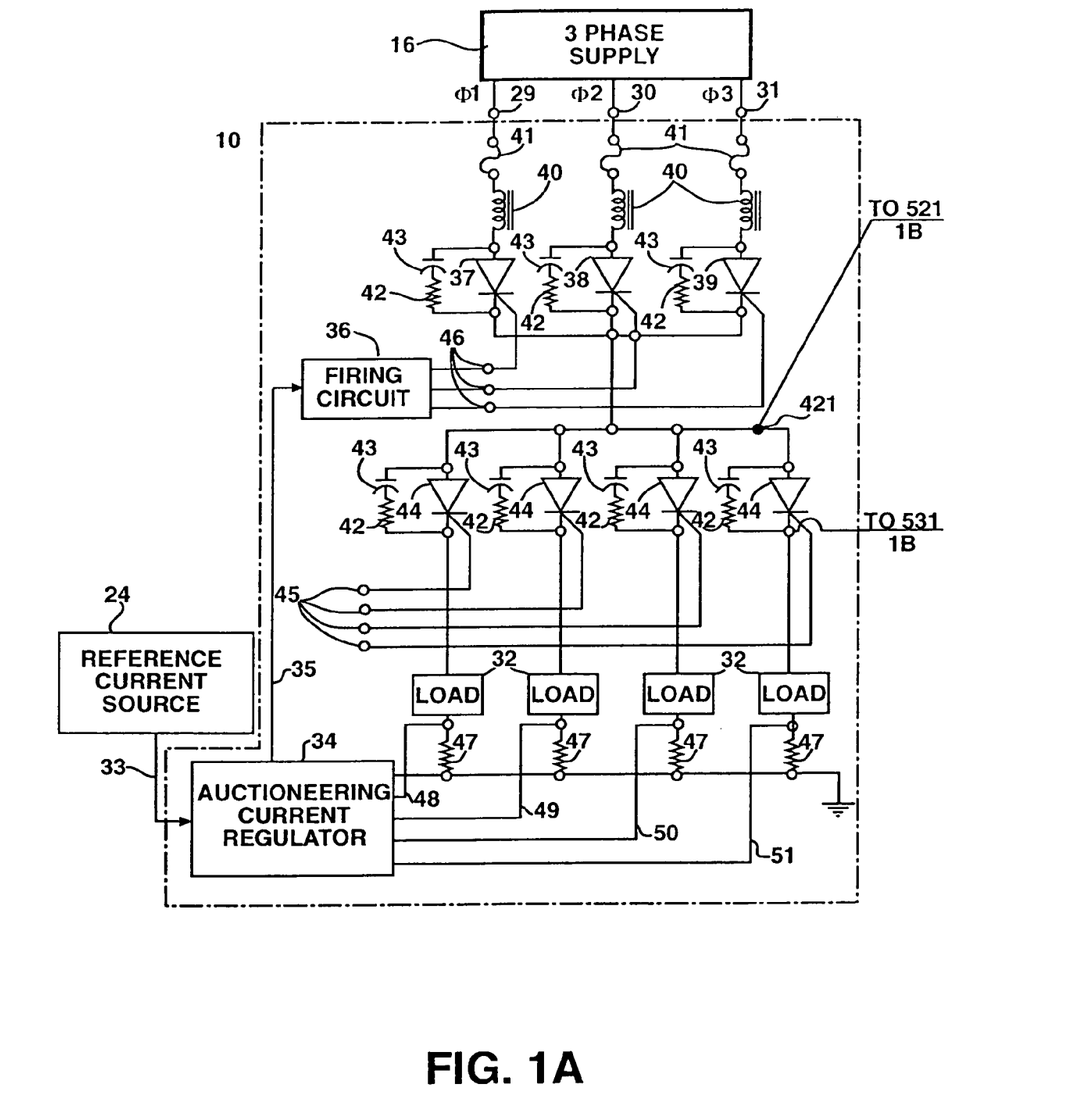
FIGS. 1 and 1A are a schematic view of the preferred embodiment of the present invention as configured for use with a moving gripper coil.
Figure 1B:
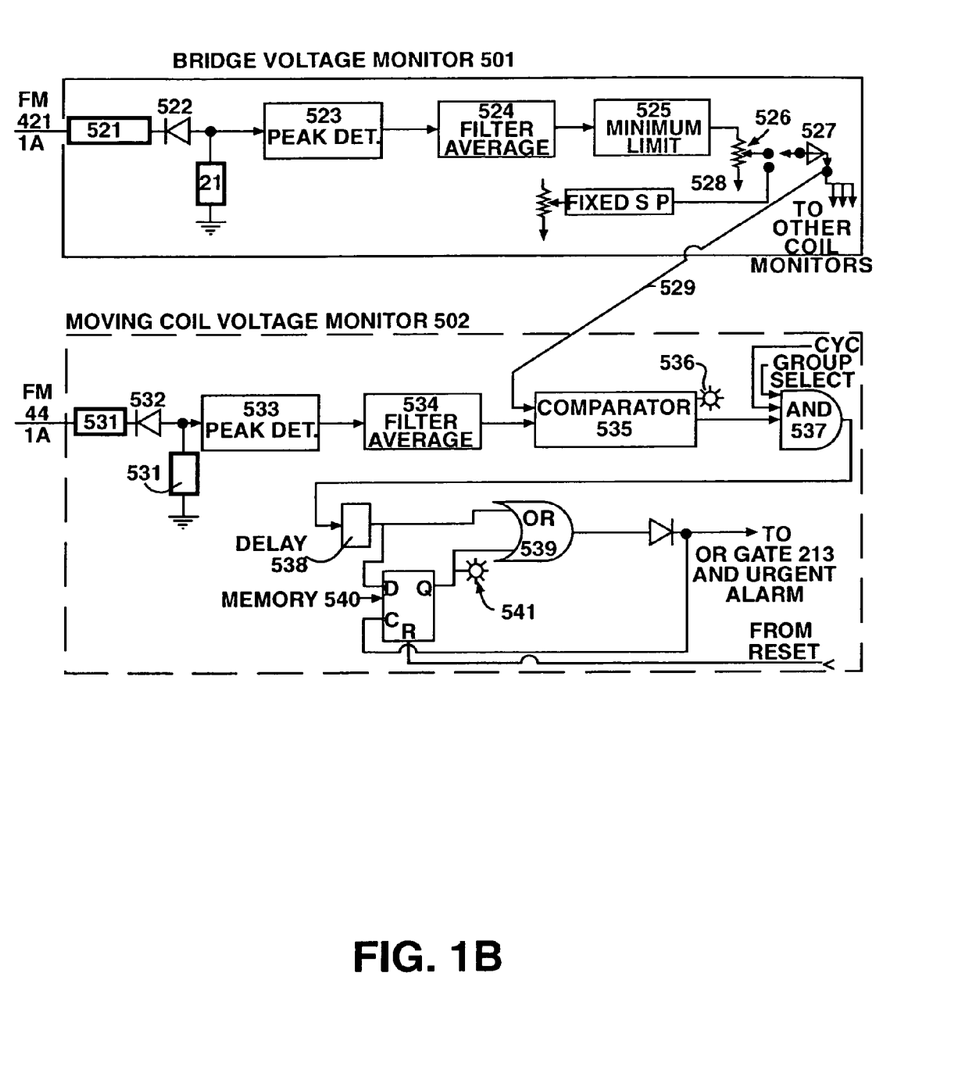

Referring first to FIGS. 1A and 1B of the present invention, a schematic diagram for the power unit and monitoring system of the present invention is shown. Such an arrangement includes portions that are described in the '890 patent. For simplicity, the numbers from this patent have been maintained, while the numbers from the present invention commence with the number 500.

The power arrangement for energizing the lift coils 32 is comprised of a three-phase power source 16 which provides a first-phase output 29, a second-phase output 30, and a third-phase output 31. A reference current source 24 provides a reference current signal according to the desired current to go through the plurality of load elements 32. The output 33 of reference current source 24 provides a signal to an improved auctioneering current regulator 34, which will be described in more detail hereinafter. The auctioneering current regulator 34 provides a signal to a firing circuit 36. The firing circuit 36 is of a type which is well known to those skilled in the art. It includes among other elements, a high frequency pulse generator for providing gate signals to sequentially fire each of the thyristors 37, 38, 39. The phase angle to the line voltage, at which the gating signals are provided, is determined by the auctioneering current regulator 34.

The signal 35 from the auctioneering current regulator 34 controls the phase angle, at which the firing circuit provides gate inputs 46 of the controlled switching devices or thyristors 37, 38, 39. Each of these devices 37, 38, 39 each of which has its anode connected to the three-phase out puts 29, 30, 31 respectively of the three-phase power supply 16 via inductive devices 40 and fuses 41, as shown. The cathodes of thyristors 37, 38, and 39 are connected to an output terminal branch 42. By varying the phase angle at which the thyristors 37, 38, 39 are energized, an output voltage across the load elements 32 from full positive to full negative is possible. Note however, that a minimum positive direct current must flow through the load elements to maintain the thyristors 37, 38, 39 conducting successively.

A resistor 42 and a capacitor 43 are provided in parallel with thyristors 37, 38, and 39 for preventing rapidly changing voltages across the same, and to cause improper induction thereof. Resistors 42 and capacitors 43 are also provided in parallel with thyristors 44. The plurality of load elements 32 are connected to the output terminal 42 of the thyristors 37, 38, 39, through the three thyristors 44.

Each thyristor 44 has an input gate 45. Normally, these thyristors 44 are gated so as to act like ordinary diodes and used to prevent circulating currents from flowing between load elements 32. In some applications, these thyristors 44 can be replaced with simple diodes and achieve these same results. To isolate load elements from the power source, thyristors 44 can be operated as an open switch. Such an arrangement is useful in a nuclear rod control system for de-energizing individual jack mechanism lift coils 32 to realign control rods, should they get out of alignment.

Current monitoring resistors 47 are provided in series with each of the load elements 32. Connections 48, 49, 50 and 51 to the auctioneering current regulator permits the same, to compare the largest voltage indicative of the current through each load element across any of the resistors 47 with the reference current signal 33 provided by reference current source 24.

For maximum positive forcing, thyristors 37, 38 and 39 are fired so that they behave as simple rectifiers.

The monitoring system of the present invention is configured for connection with this configuration. Referring now to FIG. 1B, a schematic view of the present invention as configured for use with a moving gripper coil is shown. A bridge monitoring circuit 501 is connected at wire 421 of the '890 patent. This bridge monitoring circuit is made up of a voltage divider 521, which reduced the bridge voltage to a level compatible with microelectronic devices. A rectifier 522 blocks the positive portions of the applied voltage. A negative peak detector 523, with a simple low pass filter 524, provides short-term average of the previous few peaks. A low limiting device 525 and an adjustable gain unit 526 provide a suitable output for use with coil monitors. If a simpler system is desired, the switch 527 would be set to select a manually adjusted set point 528 instead of utilizing a calculated value from 526.

The bridge monitoring circuit 501 senses the output of the three-phase bridge at wire 421. The bridge voltage monitor 501 produces an output proportional to the peak negative voltage present at its input. This output is connected to the individual coil monitors 502 for use as a set point. A coil monitor exists for each of the moving grippers. The bridge voltage monitor 501 applies a minimum value to its output so that failure of the bridge itself might be detected by the coil monitors. The bridge voltage monitor 501 can be set to provide either the calculated set point, or a manually adjustable set point by means of a switch.

A plurality of coil voltage monitors 502 are also connected to the thyristors 44. The number of coil voltage monitors 502 is dependent upon the number of coils involved in the configuration. Thus, while one coil monitor circuit 502 is shown, it is to be distinctly understood that this one circuit is representative of this portion of the invention and that multiple copies of this same circuit are also included as a part of the invention. Each voltage monitor is comprised of a voltage divider 531, rectifier 532, peak detector 533, and filter 534 which are identical to their counterparts in the bridge voltage monitor 501. A comparator 535 provides the transition from analog to logical signals. The comparator 535 is configured to provide an output of logical TRUE whenever the coil voltage falls below the set point 528, indicating an absence of current through the circuit. This signal from the comparator 535 illuminates lamp 536 to announce or signal that a fault has been detected. Depending upon the circumstances, this lamp 536 may blink because of outside circumstances, such as dirty connections outside the system.

The output from comparator 535 connects one input of an AND gate 537, which starts a delay timer 538. This delay timer 538 in turn activates the urgent alarm by driving OR gate 539. OR gate 539 includes a diode at its output, which then becomes another input to OR gate 213, which is shown in FIG. 8 of the '890 patent. The timer 538 also presents its output to a memory device 540 as data to be stored. The memory module 540 can be any one of a variety of media for storing such information. This includes, but is not limited to, computer hard drives, electronic logs, and other devices that are well known to individuals in the art. The memory module 540 will set its output signal to the state of its input signal when the urgent alarm is set by OR gate 213. The other inputs to AND gate 537, CYC and GROUP SELECT, enable monitoring prior to rod movement.

If the signal from the delay timer 538 is the initiating event for the urgent alarm, then memory 540 will set its output TRUE, both latching in the urgent alarm and lighting lamp 541 to indicate the source of the urgent alarm. If the urgent alarm was already set by some other failure detector when the signal from the delay timer 538 asserted its call for urgent alarm, then memory module 540 would have set its output FALSE at that time, ignoring the delay timer 538 as long as the urgent alarm persists.

Figure 2A:
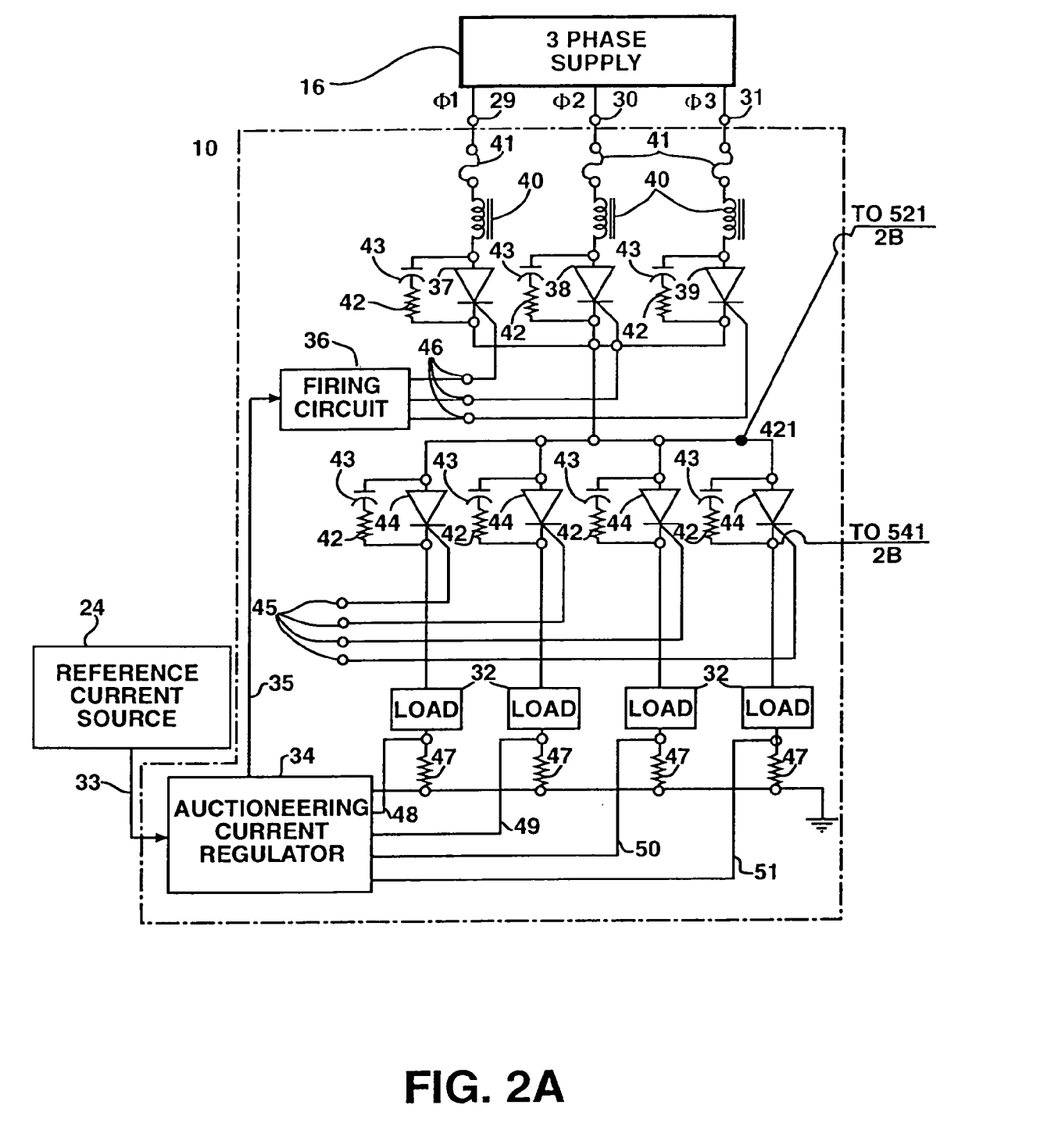
FIGS. 2A and 2B are a schematic view of the preferred embodiment of the present invention as configured for use with a stationary gripper coil.
Figure 2B:
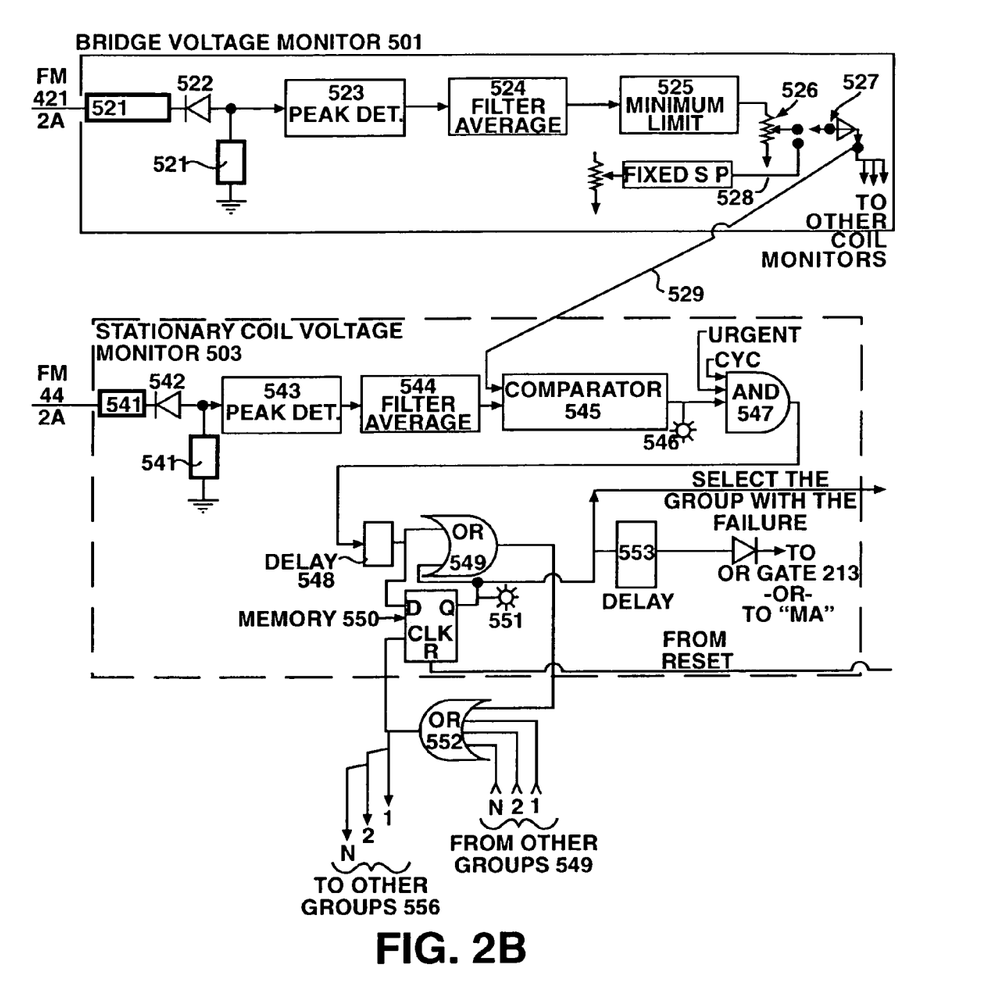

FIGS. 2A and 2B show the configuration of the present embodiment as configured for use with the stationary grippers that are configured to hold the rods in a desired position and orientation. In this embodiment, the bridge voltage monitor 501, having the same configuration as was described with the moving grippers in FIG. 1, senses the output of the three-phase bridge at wire 421. The bridge voltage monitor 501 produces an output proportional to the peak negative voltage present at its input. This output is connected to the individual coil monitors 502 for use as a set point. As previously described, each stationary gripper coil has a coil monitor. The bridge voltage monitor 501 applies a minimum value to its output in order that failure of the bridge itself might be detected by the coil monitors. As before, the monitoring switch 527 can be switched to provide a manually adjusted set point 528, if a simple system is desired.

Each stationary coil voltage monitor 503 is comprised of a voltage divider 541, a rectifier 542, peak detector 543, and a filter 544, which are identical in their configuration to those devices found in the stationary coil monitoring system 502. A comparator 545 provides the transition from analog to logical signal, its output being logical TRUE whenever the coil voltage falls below the set point. This signal from the comparator 545 illuminates lamp 546 to announce the presence of this fault.

Each individual coil monitor 503 produces a voltage proportional to the peak negative voltage at its input, which it then compares to the set point 528 received from the bridge monitor 501. An individual coil that has low negative voltage has either lost its current (due to an open connection) or has lost inductance (probable coil failure or possible magnetic anomaly at the mechanism). This feature is referred to as an absence of negative and is the characteristic which will be analyzed and signaled by the devices set forth in this patent application.

Accordingly, a comparison which reveals absence of negative voltage at the coil is made into a logical (true-false) signal. This signal illuminates a light to announce the absence of negative at a particular location. Because an absence of negative can be expected in some circumstances, the logical absence of negative signal is combined with an AND gate and two other signals obtained from the regulating system, namely NOT-URGENT-FAILURE, and NOT-CYCLING. The NOT-URGENT FAILURE signal, when false, will prevent any further action when an URGENT FAILURE is present from any other detector within the power regulating system. The NOT-CYCLING signal, when false, will prevent action during rod movement where there may be no interval of negative voltage.

Presence of all three signals true means that the affected rod will drop within a fraction of a second, so it is appropriate to activate the alarm. A ⅓ cycle delay is imposed to prevent false actuation on loss of incoming phase, which is sensed by other means in the original patent. If the absence of negative signal persists after the delay, the moveable grippers for the affected group of rods are energized and an urgent alarm is sent to the OR gate 213, which in turn activates the failure detect circuitry which is described in the '890 patent. The call for urgent alarm latches a memory, which both holds the call for urgent alarm and illuminates a second light on the coil monitor 502. This feature exists because intermittent troubles may clear themselves before someone arrives to observe the previous light, in which event the second light indicates which coil initiated the alarm. This configuration and function is provided by each stationary gripper, which are provided for each control rod being used within the system.

The output from the comparator 545 illuminates the lamp 546, connects to one input of the AND gate 547, which starts a delay timer 548. This delay timer 548 in turn activates the call for urgent alarm by driving OR gate 549 on any of the stationary coil monitors 502. If the delay timer 548 is the initiating event for activating the urgent alarm, then memory module 550 will set output TRUE, both latching in the call for urgent alarm and lighting a lamp 551 to indicate the location of the urgent alarm. If the urgent alarm was already called for by another failure detector when the delay timer 548 sent its signal, then the memory module 550 would have set its output logical FALSE at that time, ignoring the signal from the delay timer 548 until the urgent alarm is reset.

The memory module 550 sends out the call for urgent alarm to a second delay timer 553. This second delay 553 is configured to provide commutation of the multiplexing thyristors 44. The second delay 553 includes a diode at its output which becomes another input to OR gate 213, preferably the OR gate 213 is a diode wired OR gate such as is common in the trade.

Memory module 550 also sends a signal to select the group of rods which contains the detector calling for the urgent alarm. It may be desired instead of activating OR gate 213 directly from delay 553, to activate full current from the power source. This full current is more likely to be successful in stopping the falling rod.

The OR gate 213 serves all twelve monitors in a typical set up. This gate 213 provides the latch signal to each of the coils' memory modules 550 and receives inputs from all twelve stationary monitors. This combination of signals assures that only one coil monitor at a time will succeed in calling for urgent alarm. This is necessary to prevent any other group from being selected for movement prior to the correction of the fault triggering the alarm.

Figure 3A:
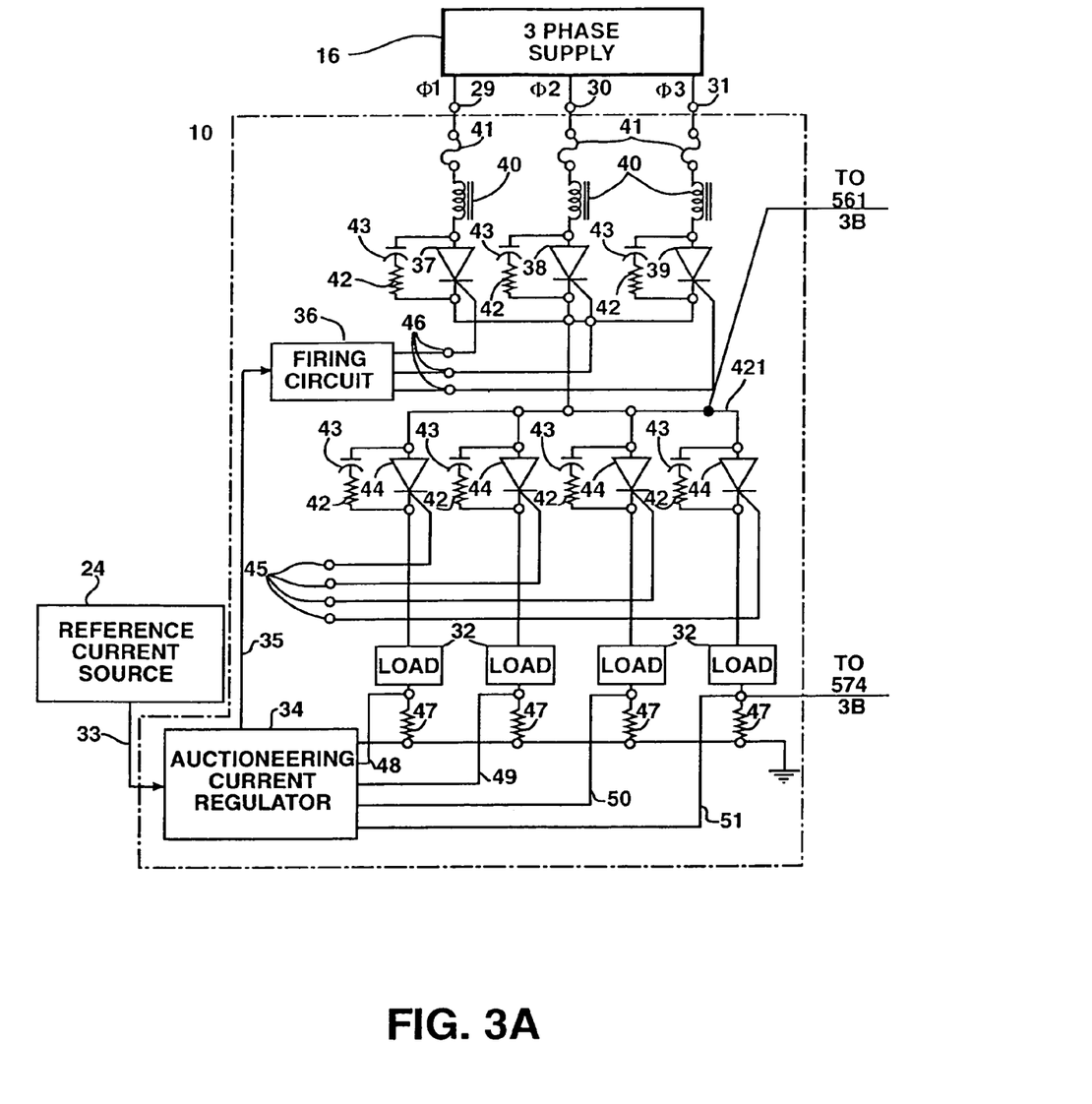
FIGS. 3A and 3B is a schematic view of an alternative embodiment of the present invention.
Figure 3B:
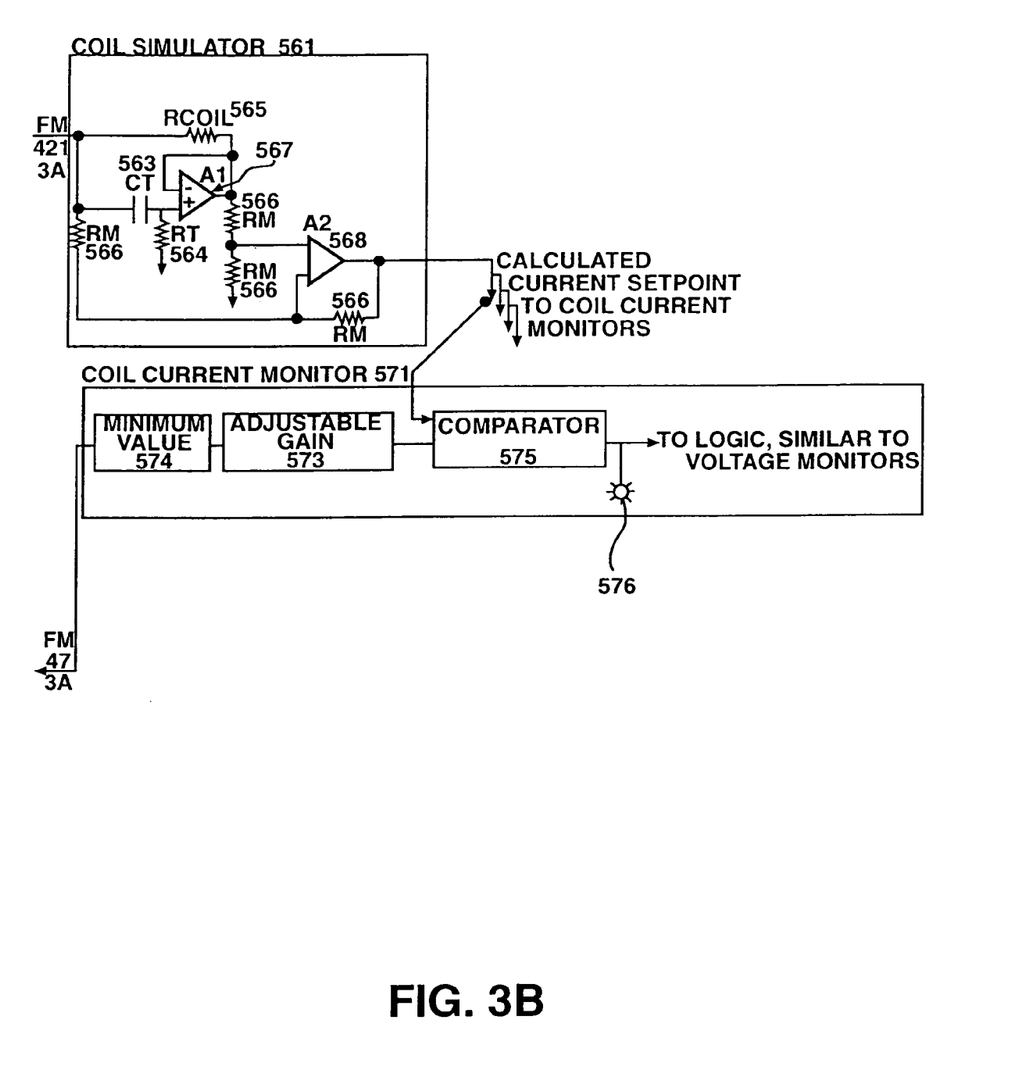

Referring now to FIG. 3, a schematic view of the coil simulator 561 is shown. This coil simulator 561 is connected to wire 421 and to comparator 575. The coil simulator 561 is an analog computing element which is well known in the industry. The coil simulator 561 senses coil voltage through a capacitor 563 and resistor 564 and produces a time constant equal to the L/R time constant of the coil being simulated. This causes the amplifier 567 to produce at its output a voltage proportional to the counter EMF from self-induction in the real coil, as predicted by the laws of physics. The voltage across the current coil is then in proportion to the current, which would flow in the real coil. A second amplifier 568 and four resistors 566 within the coil simulator 561 form a differencing amplifier, which delivers a voltage representing the current expected in the real coil.

FIG. 3 also shows the presence of a coil current monitor 571, which could be utilized to further augment the system. In this embodiment, the coil current is measured by resistors 47 shown in the '890 patent. This current is then scaled by adjustable gain 573 and compared by comparator 575 to the expected coil current as calculated by the coil simulator 61. Minimum value circuit 574 imposes a minimum value on the measured current to prevent false alarms during intervals when real current and expected current are both zero. Comparator 575 provides a logic signal to the logic systems that are described in the Absence of Negative Monitoring System that was described above. However, in this embodiment there will be no inhibition during cycling. Because the coil current monitoring system of shown in FIG. 3 could be active during stepping, while the monitoring method shown in FIG. 2 could not, inclusion of coil current monitoring would provide additional reliability to the power regulating system.

It is anticipated that the stationary grippers would employ coil current monitors 561, and moving grippers would use monitors that utilize the absence of negative method that is described in the present patent application. The difference between the current coil monitoring device and the absence of negative voltage is the parameter that is being measured. The current coil monitoring device shown in FIG. 3 measures the amount of current within the system, while the absence of negative monitoring device that is shown in the present invention measures the quantity of inductance indirectly.

Actual current flowing through each coil is measured by a coil current monitor and compared to that current which would be expected by solution of the laws of physics. Expected current is calculated by an analog computing circuit called a coil simulator. The coil simulator senses the voltage applied to the coils, computes the expected current, and provides this computed result as a set point to the coil current monitor. The coil current monitor compares measured current to a set point and produces a call for an urgent alarm when coil is determined to have inadequate current. The logic is the same as set forth above, except cycling would no longer be needed and hence would be hard wired false.

The present invention provides a substantial improvement over the prior art in that it provides complete protection against open coil circuits, both internal and external to the power regulating system. This protects the plant against the possibility of dropped control rods.

While there is shown and described the present preferred embodiment of the invention, it is to be distinctly understood that this invention is not limited thereto but may be variously embodied to practice within the scope of the following claims. From the foregoing description, it will be apparent that various changes may be made without departing from the spirit and scope of the invention as defined by the following claims.

I claim:

1. A monitoring method for preventing dropped rods in a nuclear power plant, said nuclear power plant having a plurality of coils, each of said coils configured to provide magnetic flux to operate any one of a variety of interconnected mechanical parts; said monitoring method comprising the steps of:
   providing a constant electrical flow within said coils;
   measuring induced electromagnetic force caused by said constant electrical flow a through said device;
   establishing a set point for said induced electromagnetic force;
   monitoring electrical flow to determine if said induced electromagnetic force characteristic varies below said set point;
   signaling a logic sequence to identify a fault when said induced electromagnetic force varies below said designated set point; and
   engaging a signaling system to announce when said fault has been detected,
   whereby a party having been notified of the fault by the signaling system can take appropriate measures to prevent movement of parts when a fault is present thus preventing rods from being dropped.

2. The method of claim 1 further comprising the step of providing a timed delay between receiving a first fault signal and engaging a signaling system to announce when a fault has been detected producing a second fault signal.

3. The method of claim 1 wherein negative induced electromagnetic force is measured.

4. The method of claim 1 wherein said monitoring is performed by a monitoring circuit.

5. The method of claim 4 wherein said monitoring circuit is made up of a bridge voltage monitor that senses the output of the three-phase bridge at a designated location.

\* \* \* \* \*